(12) United States Patent
Amirehteshami et al.

(10) Patent No.: US 7,627,940 B2
(45) Date of Patent: Dec. 8, 2009

(54) ORBITAL HOLE MATCH DRILLING

(75) Inventors: David H. Amirehteshami, Rossmoor, CA (US); Eric Whinnem, Whittier, CA (US); Branko Sarh, Huntington Beach, CA (US); Angelica Davancens, Reseda, CA (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 11/180,231

(22) Filed: Jul. 13, 2005

(65) Prior Publication Data

US 2007/0014645 A1      Jan. 18, 2007

(51) Int. Cl.
*B23P 15/00* (2006.01)
*B23C 3/00* (2006.01)

(52) U.S. Cl. .................. 29/557; 409/132; 409/200; 409/143; 409/179; 408/97

(58) Field of Classification Search .................. 409/132, 409/131, 200, 143, 191, 178–179, 66, 74; 29/557–558; 408/1 R, 87, 95, 97
See application file for complete search history.

(56) References Cited

U.S. PATENT DOCUMENTS

| 4,599,018 | A | * | 7/1986 | Woods .................. 408/1 R |
| 4,850,763 | A | * | 7/1989 | Jack et al. .................. 409/178 |
| 5,641,252 | A | | 6/1997 | Eriksson |
| 5,685,674 | A | * | 11/1997 | Tåquist et al. .............. 409/132 |
| 5,971,678 | A | | 10/1999 | Linderholm |
| 6,007,281 | A | * | 12/1999 | Eriksson et al. ............. 409/132 |
| 6,129,489 | A | | 10/2000 | Linderholm |
| 6,382,890 | B1 | | 5/2002 | Linderholm |
| 6,405,425 | B1 | | 6/2002 | Eriksson |
| 6,645,048 | B1 | | 11/2003 | Linderholm |
| 6,663,327 | B2 | | 12/2003 | Linderholm |
| 6,702,531 | B2 | | 3/2004 | Linderholm |
| 6,719,505 | B2 | | 4/2004 | Linderholm |
| 6,758,642 | B2 | | 7/2004 | Linderholm |
| 6,761,516 | B2 | * | 7/2004 | Pham ........................ 409/132 |
| 6,773,211 | B2 | | 8/2004 | Zackrisson |
| 6,872,036 | B2 | | 3/2005 | Linderholm |

(Continued)

FOREIGN PATENT DOCUMENTS

WO     WO-94/17944 A1  *  8/1994

(Continued)

OTHER PUBLICATIONS

Merriam-Webster's Collegiate Dictionary, 10th ed., 1998, pages including definitions of "adjacent" and "near".*

*Primary Examiner*—Erica E Cadugan
(74) *Attorney, Agent, or Firm*—Rozenblat IP LLC

(57) ABSTRACT

Methods are disclosed for producing a hole in a work-piece having first and second layers of material. The first layer of material contains a full-sized hole through the first layer of material. The first layer of material is positioned adjacent the second layer of material. An orbital drill is secured to the first layer of material to position a cutting tool of the drill within the through-hole. During operation, when the cutting tool is used to cut a hole in the second layer of material, the alignment keeps the orbital drill stationary.

15 Claims, 7 Drawing Sheets

U.S. PATENT DOCUMENTS

| | | |
|---|---|---|
| 6,877,936 B2 | 4/2005 | Linderholm |
| 6,902,361 B2 * | 6/2005 | Pettersson et al. ........... 409/178 |
| 2001/0047219 A1 * | 11/2001 | Oden ......................... 700/159 |
| 2006/0159537 A1 * | 7/2006 | Oden et al. ................. 409/131 |

FOREIGN PATENT DOCUMENTS

| | | | |
|---|---|---|---|
| WO | WO-2005/120752 A1 | * | 12/2005 |
| WO | WO-2006/088404 A1 | * | 8/2006 |

* cited by examiner

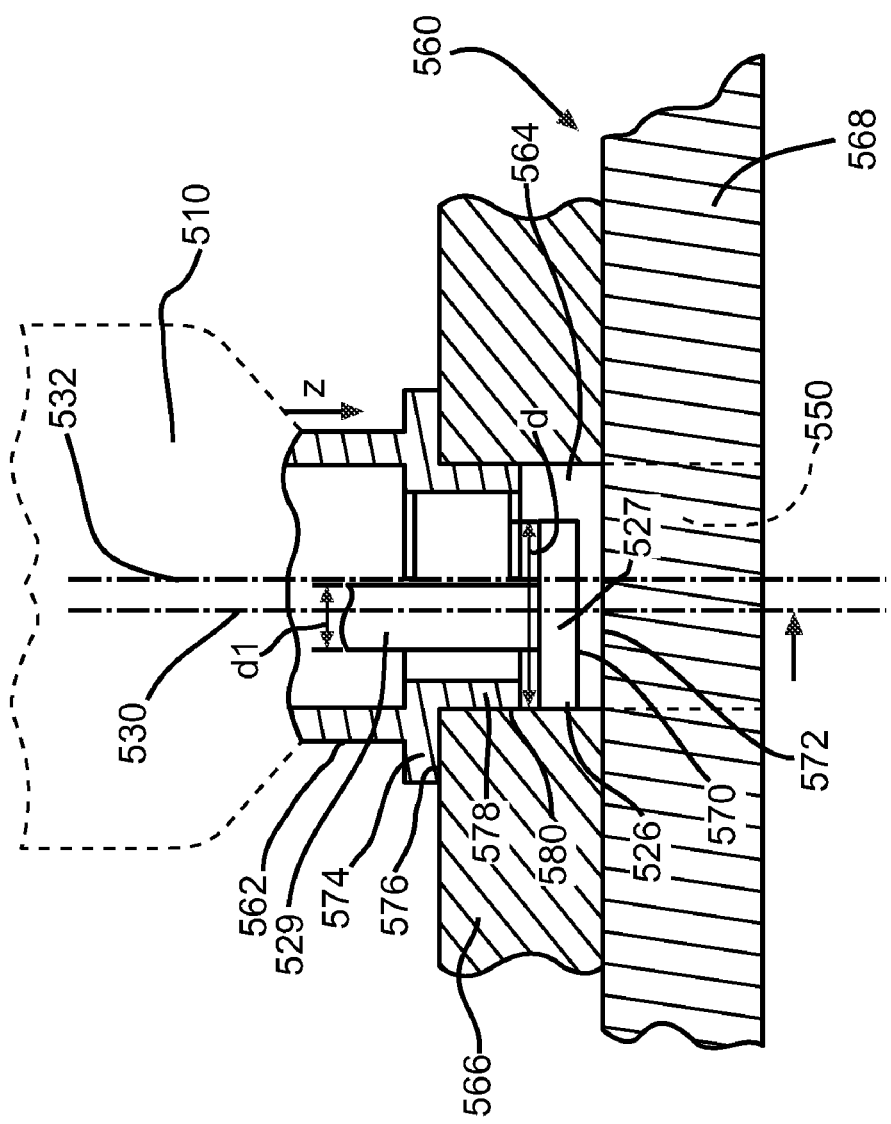
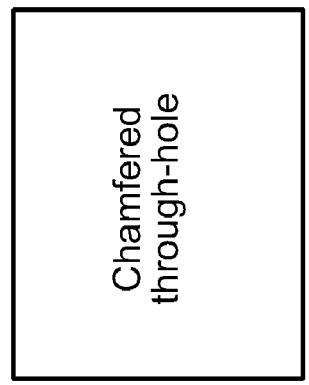
FIG. 5A
FIG. 5

ORBITAL HOLE MATCH DRILLING

BACKGROUND

In conventional drilling, a cutting tool rotates around its own axis while feeding forward into the material being drilled. The cutting edges perform best at the outside edges while the center of the drill essentially does not cut, but merely pushes its way through the material. This generates a lot of heat and thrust force which requires additional power from the drilling machine. When the drill reaches the other side of the material being drilled, the drill tip bursts through creating ragged edges that spread out to the final sized hole, leaving an exit burr around the hole. Exit burrs are unacceptable in aerospace assembly, and in many other industries, as they create stress risers and fatigue cracks in the structure.

Orbital drilling has been used in an effort to avoid many of the problems often associated with conventional drilling. With orbital drilling, the cutter rotates around its own axis but the cutter spindle is offset from the centerline of the hole by the orbital axis of the machine. This dual rotating axis approach can be described as a spiral milling method of generating a hole. The cutting edges travel at very high speed and create very small chips that are vacuumed away. No lubrication is required and burrs are typically not generated as the cutter exits the material. Moreover, the same holes can be generated using much less thrust force and torque than would be needed from a conventional drilling machine.

In the airline industry, amongst other industries, workpieces comprised of multiple layers of material are often utilized. These layers of material often have varying hardness levels. When the outermost layer of material of the workpiece is extremely hard, such as Titanium, it is difficult to accurately and efficiently drill a hole through the multiple layers of material, even utilizing orbital hole drilling. During such an orbital drilling process, damage to the cutting tool may occur, the hole may end up misaligned, the drilling process may take an extended time, and the drilled hole may end up having sharp, undesired burrs.

A method of orbital drilling a hole, in a work-piece having multiple layers, is needed to substantially avoid one or more of the problems associated with having to simultaneously drill through a hard outer layer while drilling the hole in the work-piece.

SUMMARY

In one aspect of the invention, a method is disclosed for forming a hole in a multi-layer workpiece. A workpiece is provided which includes a first layer of material with a through-hole and a second layer of material positioned adjacent to the first layer of material. An orbital drill is secured to the first layer of material in order to position a cutting tool of the drill within the through-hole. The orbital drill remains stationary with respect to the workpiece when the cutting tool is cutting a hole in the second layer of material.

In another aspect of the invention, a method is disclosed for manufacturing an aircraft component. An aircraft component is provided which includes a first aircraft element with a through-hole and a second aircraft element positioned adjacent to the first layer of material. An orbital drill is provided. The orbital drill includes a principal axis and a cutting tool with a tool axis. When in operation, the cutting tool rotates about the tool axis and orbits about the principal axis. The drill is secured to the first aircraft element such that the principal axis of the drill is substantially fixed with respect to the aircraft component when the cutting tool is in operation.

In yet another aspect of the invention, an aircraft component is disclosed comprising a first aircraft element having a through-hole and a second aircraft element positioned adjacent to the first layer of material. The second aircraft element has a hole with a diameter that is substantially equal to that of the through-hole. The hole of the second aircraft element is formed using an orbital drill. The orbital drill contains a principal axis, and includes a cutting tool with a tool axis. The cutting tool is received in the through-hole and maintains the principal axis of the drill in a substantially fixed relationship with the aircraft component. When in operation, the cutting tool rotates about the tool axis and orbits about the principal axis to cut the hole.

The present invention, together with further objects and advantages, will be best understood by reference to the following detailed description taken in conjunction with the accompanying drawings.

BRIEF DESCRIPTION OF SEVERAL VIEWS OF THE DRAWINGS

FIG. 5 and FIG. 5A respectively are a partial cross-sectional view of one embodiment of the employment of a method of the present invention, and a box diagram showing that one embodiment of a through-hole could be chamfered;

DETAILED DESCRIPTION OF THE PREFERRED EMBODIMENTS

The following description of preferred embodiments provides examples of the present invention. The embodiments discussed herein are merely exemplary in nature, and are not intended to limit the scope of the invention in any manner. Rather, the description of these preferred embodiments serves to enable a person of ordinary skill in the art to use the present invention.

The methods of the present invention may be applied to any type of orbital hole drilling apparatus. A better understanding of the methods of the present invention will be obtained by first describing conventional orbital hole drilling apparatus, as shown in FIGS. 1-4, to which the methods of the present invention may be applied. After this description, the methods of the present invention will be described using FIGS. 5-8.

Figure 1:
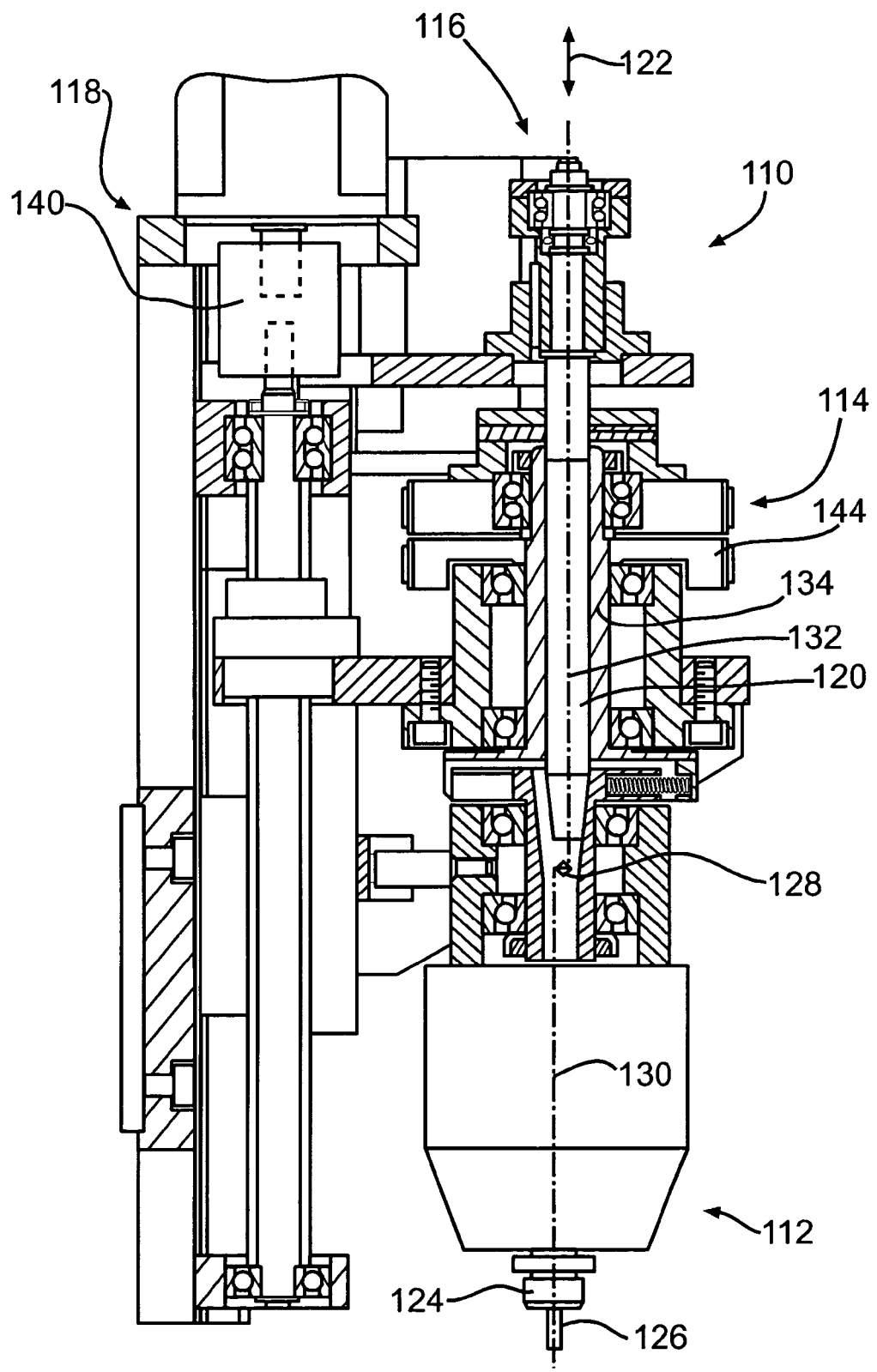
FIG. 1 is a front elevational and partial sectional view of one embodiment of a prior art orbital hole drilling apparatus to which the methods of the present invention may be applied.

FIG. 1 depicts one embodiment of a conventional orbital hole drilling apparatus 110. Generally, there is shown a spindle motor 112, a radial offset mechanism 114, an axial feed mechanism 116, and an eccentric rotation mechanism 118. Radial offset needle 120 is movable in an axial feed direction indicated by double arrow 122.

The spindle motor 112 causes a rotation of tool holder 124 and a corresponding rotation of cutting tool 126. Radial offset mechanism 114 allows a user to create a radial offset 128 between the tool axis 130 which is defined by the cutting tool 126, and the principal axis 132 which is defined by axle 134 and radial offset needle 120. In FIG. 1, the radial offset mechanism 114 has been utilized to create a radial offset 128. The axial feed mechanism 116 allows the rotating cutting tool 126 to be advanced into a work-piece (not shown) in order to machine a hole (not shown) in the work-piece. Eccentric rotation mechanism 118 includes an eccentric rotation motor 140 which drives an eccentric rotation belt 144 engaged with axle 134. Belt 144 rotates axle 134 around principal axis 132, and due to the offset of tool axis 130 from principal axis 132 created by radial offset mechanism 114, provides a corresponding eccentric rotation of cutting tool 126 around principal axis 132.

The operation of eccentric rotation mechanism 118 causes cutting tool 126 to oscillate or orbit around principal axis 132 while tool 126 simultaneously rotates about its own axis 130. The radius of the circular oscillation is substantially equal to the radial offset between tool axis 130 and principal axis 132. Using the orbital tool drilling apparatus 110, cutting tool 126 can be simultaneously fed in an axial direction, rotated about its own axis 130, and eccentrically oscillated about a principal axis 132 in order to produce a hole (not shown) having a diameter greater than the diameter of cutting tool 126. In addition, by using radial offset mechanism 114 to adjust the radial offset of cutting tool 126 during the machining process, it is possible to produce conical holes or other types of axis-symmetrical complex-shaped holes.

Figure 2:
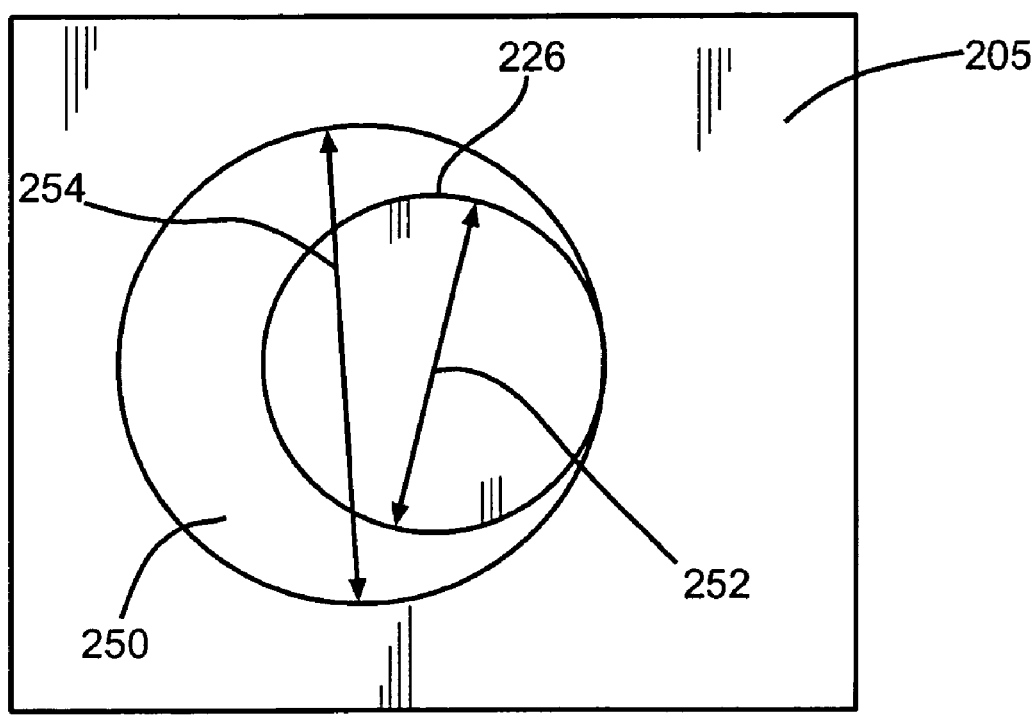
FIG. 2 is a top plan schematic view of a cutting tool of a prior art orbital hole drilling apparatus positioned within a hole of a layer of material.

FIG. 2 shows a schematic view of a cutting tool 226 of a conventional orbital hole drilling apparatus producing a hole 250 in a layer of material 205. The diameter 252 of the cutting tool 226 is substantially smaller than the diameter 254 of the hole 250 being produced. This is accomplished due to the rotation of the offset cutting tool 226 around a principal axis (not shown).

Figure 4:
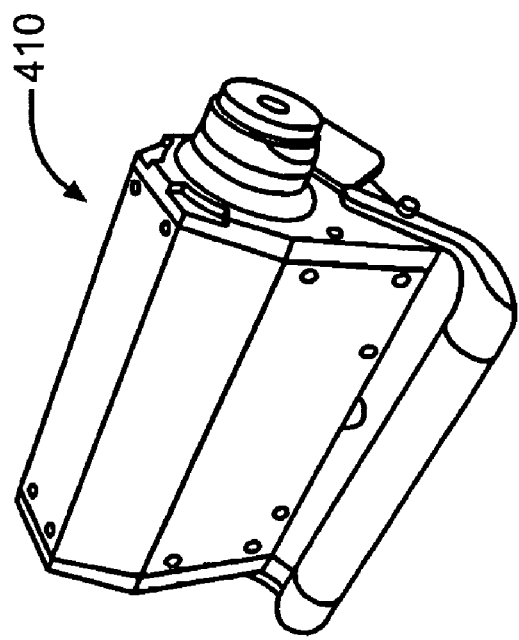
FIG. 4 is a perspective view of another embodiment of a commercially available prior art orbital drilling unit to which the methods of the present invention may be applied.
Figure 3:
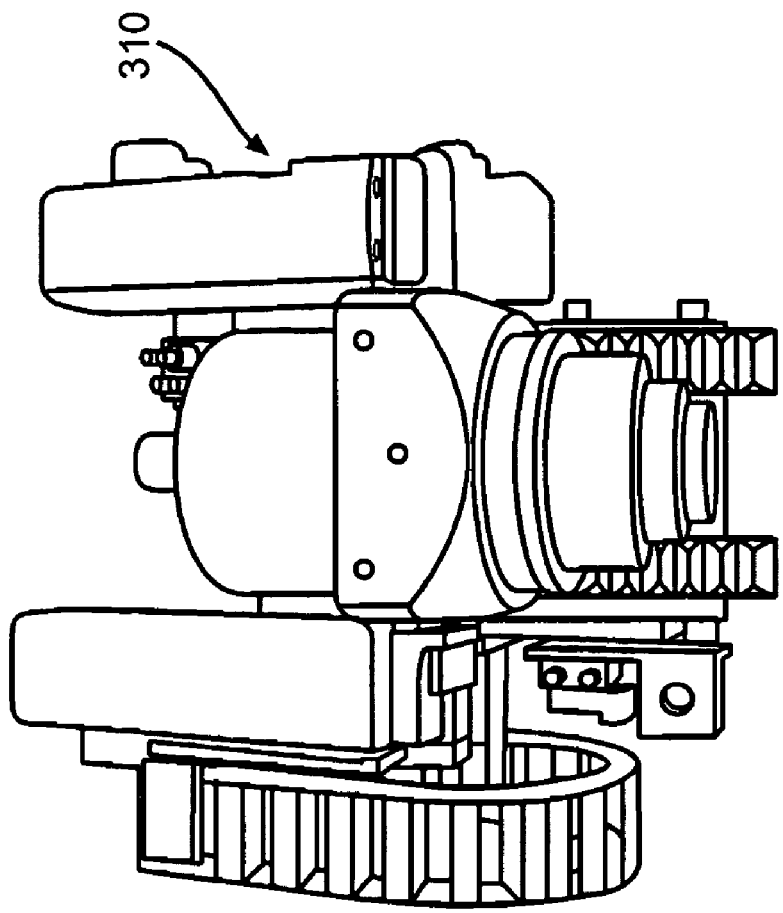
FIG. 3 is a perspective view of another embodiment of a commercially available prior art orbital drilling unit to which the methods of the present invention may be applied.

FIGS. 3 and 4 show two additional embodiments of conventional orbital drilling units to which the methods of the present invention may be applied. The machine mounted orbital drill unit 310 shown in FIG. 3 is programmed with a numerical control. The orbital drill unit 410 shown in FIG. 4 is portable and may be carried to the assembly area by a mechanic and locked into a drill template attached to the structure being assembled.

FIG. 5 depicts an orbital hole drilling apparatus 510 utilizing one embodiment of a method of the present invention to orbital drill a hole 550 in a multiple-layered work-piece 560. A shoulder bushing 562 substantially stabilizes the orbital drill 510. As shown, a full-sized through hole 564 has been pre-formed in a Titanium outer (first) layer 566 of the multiple-layered work-piece 560. The multiple-layered work-piece 560 comprises a portion of an airplane such as a portion of a wing, or a portion of an airplane's main body. In other embodiments, the work-piece 560 may comprise a non-aeronautical apparatus such as a vehicle assembly or other type of apparatus. In still other embodiments, the outer layer 566 may comprise any material known in the art, such as Steel, Aluminum, Graphite, or a composite material. The full-sized through hole 564 in the outer layer 566 may be formed using any process known in the art, such as drilling or molding, and is preferably chamfered as shown in FIG. 5A. At least one additional layer 568 of the work-piece 560, preferably comprised of a material softer than the Titanium outer layer 566, is positioned substantially parallel to the Titanium outer layer 566 adjacent the full-sized hole 564.

The additional layer 568 comprises any material known in the art softer than the material of the outer layer 566, such as Aluminum, Graphite, or a composite material. In other embodiments, the additional layer 568 and subsequent layers in the workpiece 560, may comprise any material known in the art, such as Titanium, which is as hard or harder than the material of the outer layer 566. In still other embodiments, the additional layer 568 may be positioned in non-parallel configurations near the outer layer 566.

A cutting tool 526 of an orbital hole drilling apparatus 510 is placed into the full-sized hole 564, so that the bottom 570 of the cutting tool 526 is substantially parallel to an outer surface 572 of the additional layer 568. In other embodiments, the cutting tool 526 may be configured in different alignments. The cutting tool's axis 530 is offset from the principal axis 532. In other embodiments, the cutting tool's axis 530 may be aligned with the principal axis 532. The cutting tool 526 is stabilized by a connected shoulder bushing 562 which has a flange 574 abutting against an outer surface 576 of the outer layer 566 and a substantially cylindrical surface 578 abutting against an inner surface 580 of the full-sized hole 564 in the outer layer 566. The diameter d of the cutting tool's head 527 is larger than the diameter d1 of the cutting tool's shaft 529. The flange 574 may abut against the outer surface 576 of the outer layer 566 in a parallel or non-parallel configuration. Similarly, the substantially cylindrical surface 578 may abut against the inner surface 580 of the full-sized hole 564 in the outer layer 566 in a parallel or non-parallel configuration.

The shoulder bushing 562 helps to stabilize the cutting tool 526 in the Z direction. The orbital hole drilling apparatus 510 is used to drill a hole 550 in the additional layer 568, which is a continuation of the hole 564. The hole 550 may be drilled to match the size of the full-sized, pre-formed hole 564. In other embodiments, the hole 550 may be drilled in any configuration, shape, or size. Moreover, the hole 550 may be drilled through the entire additional layer 568 and subsequent layers in the workpiece 560. A fastening device (not shown), such as a bolt or other fastening device known in the art, may be inserted from the full-sized through hole 564 into the hole 550 to attach the outer layer 566 to the additional layer 568 and subsequent layers in the workpiece 560.

Figure 6:
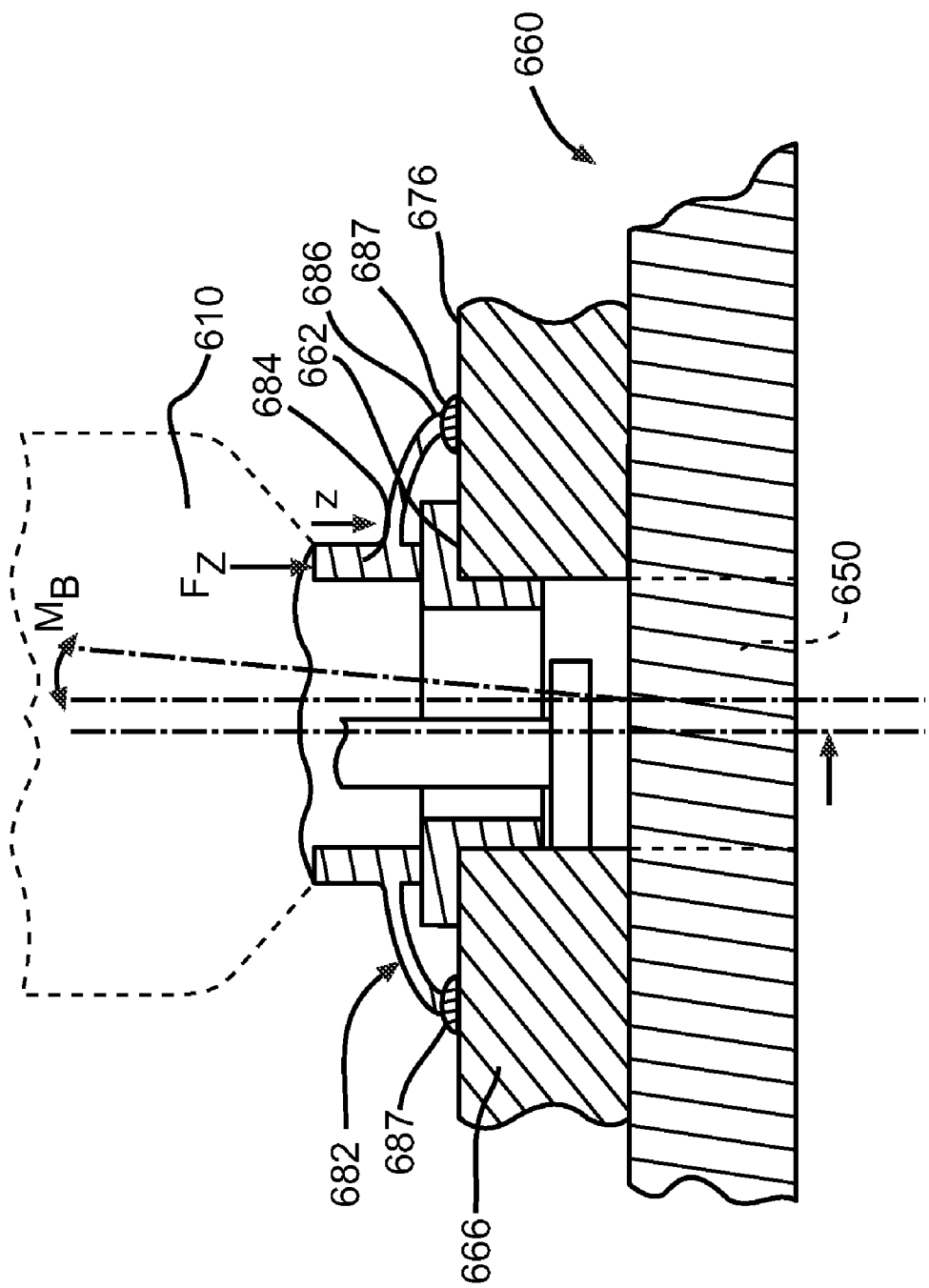
FIG. 6 is a partial cross-sectional view of another embodiment of the employment of a method of the present invention.

FIG. 6 depicts an orbital hole drilling apparatus 610 utilizing another embodiment of a method of the present invention to orbital drill a hole 650 in a multiple-layered work-piece 660 utilizing a shoulder bushing 662 and a stabilizing arm 682 to substantially stabilize the orbital drill 610. One end 684 of the stabilizing arm 682 is attached to the shoulder bushing 662 while the other end 686 of the stabilizing arm 682 is attached to an outer surface 676 of the outer layer 666. The end 686 of the stabilizing arm 682 may be attached to the outer surface 676 of the outer layer 666 using a device 687 comprising one of a suction cup, a magnet, a mechanical clamp, or by any other attachment mechanism known in the art. Due to the stabilizing arm 682, the orbital drill's 610 motion in the ±Z direction is substantially blocked when positive $F_z$ forces are less than negative $F_z$ forces. In addition, unwanted rotational movement of the orbital drill 610 is substantially restricted. Moreover, undesired deviation of the orbital drill 610 from a perpendicular position, which is sometimes caused by applying bending moment $M_b$ to the orbital drill 610, is substantially avoided.

Figure 7:
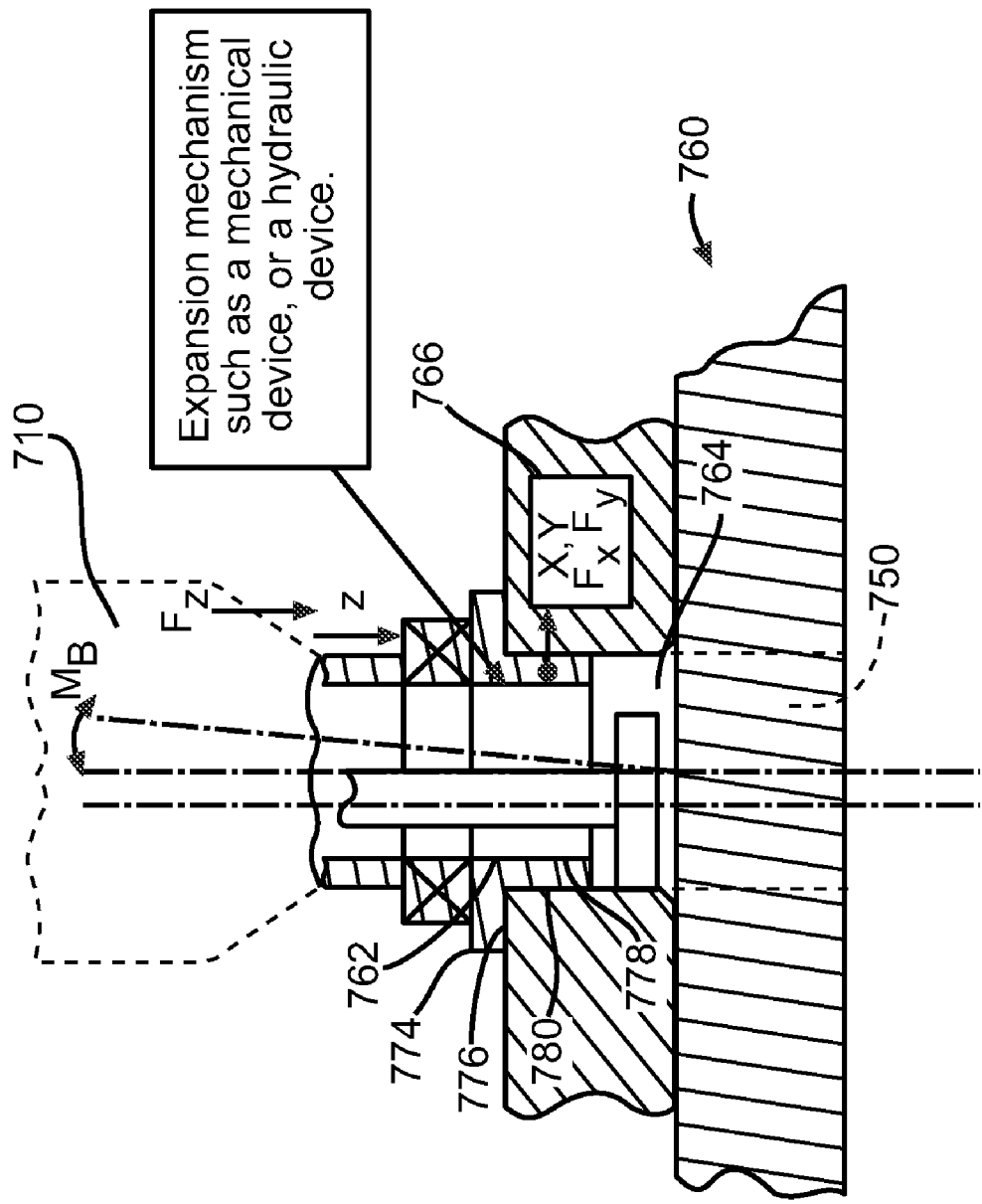
FIG. 7 is a partial cross-sectional view of yet another embodiment of the employment of a method of the present invention.

FIG. 7 shows an orbital hole drilling apparatus 710 utilizing another embodiment of a method of the present invention to orbital drill a hole 750 in a multiple-layered work-piece 760. In this embodiment, an expandable, substantially cylindrical bushing 762 provides a substantially tight fit of the bushing 762 within the full-sized, pre-formed hole 764 in the outer layer 766. The substantially cylindrical surface 778 of the bushing 762 is expanded so that it abuts against an inner surface 780 of the full-sized hole 764 in the outer layer 766, while the flange 774 abuts against an outer surface 776 of the outer layer 766. The bushing 762 expansion may be achieved using any type of expansion mechanism known in the art including mechanical, and hydraulic devices as shown in FIG. 7. Use of the expansion mechanism substantially avoids displacement of the orbital drill 710 in the X-Y plane caused by $F_x$ and $F_y$ process forces. Movement of the orbital drill 710, caused by drilling thrust forces $F_z$ and rotational torque forces, is also substantially restrained.

Figure 8:
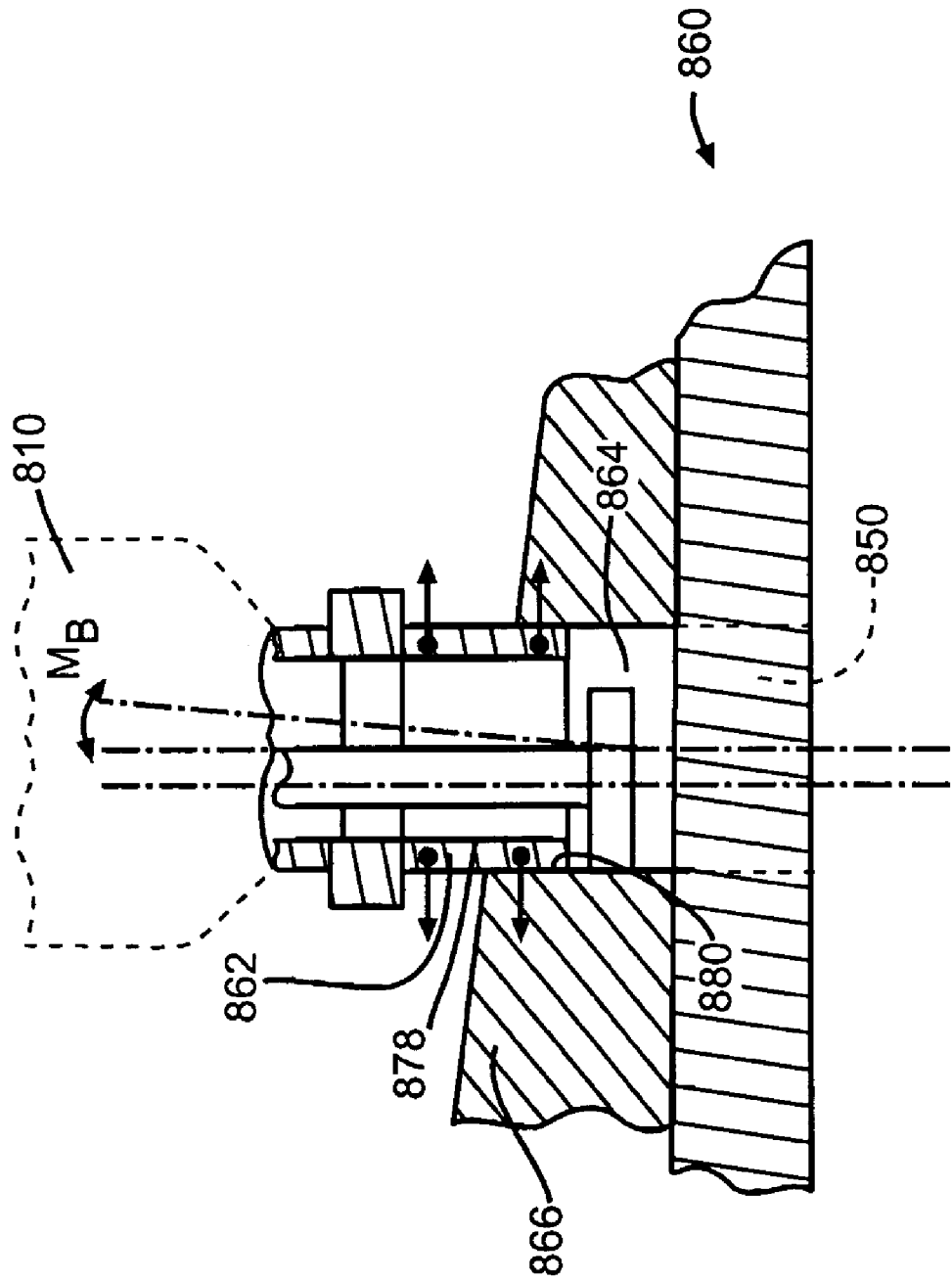
FIG. 8 is a partial cross-sectional view of another embodiment of the employment of a method of the present invention.

FIG. 8 depicts an orbital hole drilling apparatus 810 utilizing another embodiment of a method of the present invention to orbital drill a hole 850 in a multiple-layered work-piece 860 having a sloped outer layer 866. An expandable, substantially cylindrical bushing 862 is utilized to substantially lock the orbital drill 810 in place within a full-sized, pre-formed hole 864 in the sloped outer layer 866 without the use of a flange. The substantially cylindrical surface 878 is expanded so that it abuts against an inner surface 880 of the full-sized hole 864 in the outer layer 866. Use of the bushing expansion mechanism improves the stability of the orbital drill 810 and aids in substantially resisting bending moments $M_b$.

The methods of the present invention may allow for a hole to be drilled in additional layers of a multiple-layered work-piece utilizing a full-sized, pre-formed hole in a Titanium or other material outer layer of the work-piece. These methods may substantially avoid one or more of the problems associated with having to simultaneously drill through a Titanium or other material outer layer, such as time-inefficiency, damage to the cutting tool, and inaccurateness. Additionally, these methods may allow for burr-less, dry-drilling, with chips evacuated during the drilling process.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that the appended claims, including all equivalents thereof, are intended to define the scope of the invention.

The invention claimed is:

1. A method of drilling a hole in a multi-layer integrated workpiece using a pre-fabricated hole through one of the layers of the workpiece, the method comprising:
   providing a multi-layer integrated workpiece, wherein the multi-layer integrated workpiece includes a first layer of material with a pre-fabricated through-hole and a second layer of material positioned near the first layer of material;
   securing an orbital drill to the first layer of material of the multi-layer integrated workpiece by receiving a bushing within the pre-fabricated through-hole such that a cutting tool of the orbital drill is positioned within the pre-fabricated through-hole of the workpiece, and the orbital drill is stationary with respect to the multi-layer integrated workpiece; and
   drilling a hole in the second layer of material of the multi-layer integrated workpiece using the orbital drill.

2. The method of claim 1 wherein the securing step further comprises securing the orbital drill to the first layer of material such that a principal axis about which the cutting tool rotates is fixed relative to the workpiece.

3. The method of claim 1 wherein the workpiece comprises a vehicle or aircraft component and each of the first and second layers of material comprise a portion of the vehicle or aircraft component.

4. The method of claim 1 wherein the providing step further comprises providing the workpiece in which the first and second layers of material each have a different hardness.

5. The method of claim 4 wherein the providing step further comprises providing the workpiece in which the hardness of the first layer of material is greater than the hardness of the second layer of material.

6. The method of claim 1 wherein the providing step further comprises providing the workpiece in which at least one of the first and second layers of material comprises one of Titanium, Graphite, Steel, and Aluminum.

7. The method of claim 1 wherein the drilling step further comprises drilling the hole through the second layer of material.

8. The method of claim 1 wherein the drilling step further comprises drilling the hole in the second layer of material such that the hole has substantially the same diameter as the through-hole of the first layer of material.

9. The method of claim 1 wherein the securing step further comprises securing the drill to the first layer of material by expanding said portion of said bushing against an inner surface of said through-hole using at least one of a mechanical and hydraulic device.

10. The method of claim 1 wherein the securing step further comprises securing the orbital drill to the first layer of material such that a portion of the bushing abuts against at least a portion of a surface of the through-hole.

11. The method of claim 1 wherein the bushing further includes a flange, the securing step further comprising securing the drill to the first layer of material such that the flange contacts a surface of the first layer of material.

12. The method of claim 1 wherein the bushing further includes stabilizing arms, the securing step further comprising securing the drill to the first layer of material such that the stabilizing arms contact a surface of the first layer of material.

13. The method of claim 12 wherein at least one end of one or more of the stabilizing arms comprises at least one of a suction cup, magnet, and a clamp, the securing step further comprising securing the drill to the first layer of material such that said at least one end of said one or more stabilizing arms contacts said surface of said first layer of material.

14. The method of claim 1 wherein the providing step further comprises providing the workpiece in which the through-hole is chamfered.

15. A method of manufacturing an aircraft component, the method comprising:
   providing an aircraft component including a first aircraft element with a pre-fabricated through-hole and a second aircraft element positioned near the first aircraft element;
   providing an orbital drill with a principal axis and including a cutting tool with a tool axis, the cutting tool rotating about the tool axis and orbiting about the principal axis when in operation;
   securing the orbital drill to the first aircraft element by receiving a bushing within the pre-fabricated through-hole such that the cutting tool is positioned within the pre-fabricated through-hole of the first aircraft element and the principal axis of the orbital drill is substantially fixed with respect to the aircraft component when the cutting tool is in operation; and
   cutting a hole in the second aircraft element using the cutting tool.

* * * * *

UNITED STATES PATENT AND TRADEMARK OFFICE
CERTIFICATE OF CORRECTION

PATENT NO. : 7,627,940 B2 Page 1 of 1
APPLICATION NO. : 11/180231
DATED : December 8, 2009
INVENTOR(S) : Amirehteshami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this

Second Day of November, 2010

David J. Kappos
*Director of the United States Patent and Trademark Office*